U. CRAMER.
Pot-Scraper.

No. 163,918.  Patented June 1, 1875.

Attest:  
C. A. McGilton  
Jno. Doty

Inventor:  
Urias Cramer  
per his attorneys  
R. S. & A. P. Lacey

UNITED STATES PATENT OFFICE.

URIAS CRAMER, OF NEW PHILADELPHIA, OHIO.

IMPROVEMENT IN POT-SCRAPERS.

Specification forming part of Letters Patent No. 163,918, dated June 1, 1875; application filed September 22, 1874.

*To all whom it may concern:*

Be it known that I, URIAS CRAMER, of New Philadelphia, in the county of Tuscarawas and State of Ohio, have invented certain new and useful Improvements in Pot-Scrapers; and I do hereby declare that the following is a full, clear, and exact description thereof, which will enable others skilled in the art to which it pertains to make and use the same, reference being had to the accompanying drawings, and to the letters of reference marked thereon, which form a part of this specification.

The object of my invention is to furnish a convenient and handy device for scraping kettles, boilers, and similar utensils of any dimensions, having either straight sides with angles, or curved sides of any radius.

It consists in a scraper made in form of an elongated cup, with sloping sides, straight and curved edges, angular points, and a flat grinding-surface for keeping the scraping-edges sharp.

Figure 1:
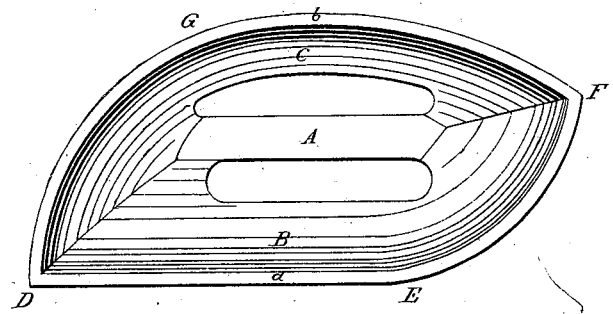
Figure 2:
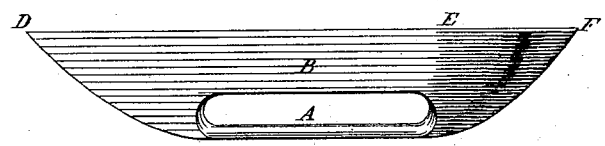
Figure 3:
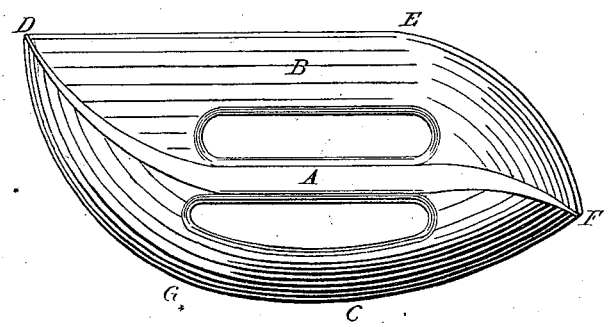

Figure 1 is a plan view, Fig. 2 a side elevation, and Fig. 3 an under-side view, of my device.

A is the scraper, made from any suitable material. It is made in form of an elongated cup or bowl, and may have its bottom closed or left partially or entirely open, as desired, and has its sides inclined or sloped inwardly. I prefer to have the bottom open, as shown in the drawings, thereby permitting any substance removed from the vessel by the scraper used with the bowl turned upward to pass through without interfering with the hand, or requiring a special act to remove it. When used in the inverted position shown in Fig. 3, the openings afford better facilities for holding the implement with greater firmness.

The side B is constructed so as to have the straight edge D E and the short-curved edge E F. The side C is constructed with the long, irregular, large-curved edge F G D.

It will be seen that the scraper, when formed with the sides made as described, will have the sharp, angular points D F.

When the edges become dull in use they may be readily sharpened by grinding on the horizontal surfaces $a\ b$.

It will be seen that with a scraper constructed as herein described, vessels having sharp angles, straight sides, or sides curved on any radius, may be cleansed.

It is operated by passing it upward or downward over the surface to be cleansed. It can be readily reversed or inverted, and any edge or point brought to bear on the vessel.

Having described my invention, what I claim, and desire to secure by Letters Patent, is—

A pot-scraper, A, constructed with the straight edge D E, and curved edges E F and F G D, as described, and for the purpose specified.

In testimony that I claim the foregoing as my own I hereto affix my signature in presence of two witnesses.

URIAS CRAMER.

Witnesses:
 J. H. BOOTH,
 O. P. TAYLOR.